US012759931B2

(12) United States Patent
Singh et al.

(10) Patent No.: US 12,759,931 B2
(45) Date of Patent: Oct. 13, 2026

(54) CEMENTITIOUS COMPOSITION

(71) Applicant: Henkel AG & Co. KGaA, Duesseldorf (DE)

(72) Inventors: Sangita Singh, Haryana (IN); Jayesh P. Shah, Pune (IN); Paresh Vallabhbhai Raiyani, Pune (IN)

(73) Assignee: Henkel AG & Co. KGaA, Duesseldorf (DE)

( * ) Notice: Subject to any disclaimer, the term of this patent is extended or adjusted under 35 U.S.C. 154(b) by 511 days.

(21) Appl. No.: 18/330,468

(22) Filed: Jun. 7, 2023

(65) Prior Publication Data

US 2023/0312414 A1 Oct. 5, 2023

Related U.S. Application Data

(63) Continuation of application No. PCT/EP2021/085613, filed on Dec. 14, 2021.

(30) Foreign Application Priority Data

Dec. 21, 2020 (IN) ............................. 202041055549

(51) Int. Cl.

| | |
|---|---|
| ***C04B 14/06*** | (2006.01) |
| ***C04B 7/32*** | (2006.01) |
| ***C04B 14/10*** | (2006.01) |
| ***C04B 14/32*** | (2006.01) |
| ***C04B 28/06*** | (2006.01) |
| ***C04B 28/08*** | (2006.01) |
| ***C04B 40/06*** | (2006.01) |
| ***C04B 41/50*** | (2006.01) |
| ***C09D 1/06*** | (2006.01) |
| *C04B 103/32* | (2006.01) |
| *C04B 111/00* | (2006.01) |
| *C04B 111/20* | (2006.01) |
| *C04B 111/34* | (2006.01) |

(52) U.S. Cl.

CPC .............. *C04B 7/32* (2013.01); *C04B 14/062* (2013.01); *C04B 14/10* (2013.01); *C04B 14/324* (2013.01); *C04B 28/06* (2013.01); *C04B 28/08* (2013.01); *C04B 40/065* (2013.01); *C04B 41/508* (2013.01); *C04B 41/5083* (2013.01); *C09D 1/06* (2013.01); *C04B 2103/32* (2013.01); *C04B 2111/00043* (2013.01); *C04B 2111/00431* (2013.01); *C04B 2111/00508* (2013.01); *C04B 2111/00517* (2013.01); *C04B 2111/00525* (2013.01); *C04B 2111/00551* (2013.01); *C04B 2111/2038* (2013.01); *C04B 2111/34* (2013.01); *Y02W 30/91* (2015.05)

(58) Field of Classification Search

CPC ......... C04B 7/32; C04B 14/062; C04B 14/10; C04B 14/324; C04B 28/06; C04B 28/08; C04B 40/065; C04B 41/508; C04B 2103/32; C04B 2111/00043; C04B 2111/00431; C04B 2111/00508; C04B 2111/00517; C04B 2111/00525; C04B 2111/00551; C04B 2111/2038; C04B 2111/34; C04B 14/06; C04B 14/066; C04B 14/32; C04B 14/303; C04B 14/306; C04B 14/04; C04B 14/046; C04B 2111/00482; C04B 41/50; C04B 18/141; C04B 14/043; C04B 40/0028; C04B 18/025; C04B 18/023; C04B 14/041; C04B 14/4693; C04B 18/142; C09D 1/06; Y02W 30/91

See application file for complete search history.

(56) References Cited

U.S. PATENT DOCUMENTS 2,339,163 A * 1/1944 Friedlander ............. C04B 28/06 106/692
5,135,576 A 8/1992 Johansen et al.
5,932,506 A * 8/1999 Bogan ................... C04B 35/103 501/120
6,313,056 B1 * 11/2001 Li ........................... C04B 35/66 106/800
6,864,199 B2 3/2005 Doza et al.
10,221,096 B2 3/2019 Dubey
11,214,519 B2 1/2022 Falger et al.
2016/0075852 A1 * 3/2016 Lai ............................ C04B 7/02 524/2

FOREIGN PATENT DOCUMENTS

CN 1618887 A 5/2005
CN 101570650 A 11/2009
CN 108137423 A 6/2018
CN 111263739 A 6/2020
EP 3103779 A1 12/2016
FR 2943665 A1 10/2010
JP 2002220290 A * 8/2002
JP 2005139010 A 6/2005

(Continued)

OTHER PUBLICATIONS

JP-2002220290-A, machine translation (Year: 2002).*

(Continued)

*Primary Examiner* — Marites A Guino-O Uzzle

(74) *Attorney, Agent, or Firm* — Sun Hee Thomas

(57) ABSTRACT

The present invention is directed to a two-component (2K) anhydrous composition comprising a first component (1) comprising calcium aluminate cement; Ground Granulated Blast Furnace Slag (GGBS); and fumed silica; and a second component (2) comprising calcined bauxite; and fused zirconia mullite.

20 Claims, No Drawings

(56) References Cited

FOREIGN PATENT DOCUMENTS

| | | |
|---|---|---|
| JP | 2006513966 A | 4/2006 |
| JP | 2020128313 A | 8/2020 |

OTHER PUBLICATIONS

GNPGraystar. Technical Data Sheet [retrieved from the internet on Nov. 13, 2025 from <URL:https://gnpgraystar.com/wp-content/uploads/2022/02/FusedZirconiaMullite2022.pdf>] (Year: 2020).*

Mesh and Micron Sizes [retrieved from the internet on Nov. 13, 2025 from <URL:https://www.industrialspec.com/images/files/mesh-micron-sizes-chart-ebook-ism.pdf>] (Year: 2020).*

Serry M A et al.: "Bauxite Based Low and Ultralow Cement Castables," British Ceramic Transactions, Institute of Materials, London, GB, vol. 101, No. 4, Jan. 1, 2002 (Jan. 1, 2002), pp. 165-168, XP008071592, ISSN: 0967-9782, DOI: 10.1179/096797802225003343, Chapters: "Introduction," "Materials and Experimental Procedures," "Preparation and characterisation;" figures 1, 2; table 1.

Evariste Ouedraogo et al: "Refractory concretes uniaxial compression behaviour under high temperature testing conditions", Journal of the European Ceramic Society, Elsevier, Amsterdam, NL, vol. 31, No. 15, Jul. 13, 2011 (Jul. 13, 2011) , pp. 2763-2774, XP028284110, ISSN: 0955-2219, DOI: 10.1016/J.JEURCERÄMSOC.2011.07.017 [retrieved on Jul. 19, 2011] Sample Bau-ULCC in chapter 2.1.

International Search Report for International Patent Application No. PCT/EP2021/085613; Mailing Date: Apr. 11, 2022.

* cited by examiner

CEMENTITIOUS COMPOSITION

FIELD OF THE INVENTION

The present invention is directed to a two-component (2K) cementitious composition. More particularly, the present invention is directed to a two-component (2K) composition comprising: a first component (1) comprising calcium aluminate cement, Ground Granulated Blast Furnace Slag (GGBS) and fumed silica; and a second component (2) comprising calcined bauxite and fused zirconia mullite.

BACKGROUND OF THE INVENTION

Cementitious materials are finding increased utility as coatings on industrial machinery, industrial installations, commercial machinery, commercial equipment and structural materials which are exposed to high temperatures, potentially concomitantly with exposure to corrosive chemicals and/or abrasive forces. The cured or set material can provide a robust composite structure which protects the underlying substrate from these harsh environmental conditions.

A number of impediments to the more expansive use of cementitious coatings in this manner have however been identified. Firstly, many industrial installations which would otherwise be candidates for such a coating have complicated shapes: pipework, chutes, hoppers, bunkers, bins and furnaces may be presented as illustrative examples of structures of complex configuration. Such complexity imposes a need for the coating to have dimensional stability. Secondly, the shrinkage upon setting of a castable material or applied coating can create gaps in the casted structure, cracks or unevenness in the coating and/or mechanical stress in the coated structure. Thirdly, such coating compositions must exhibit appropriate adherence to the substrate concerned. And, further, the compositions should demonstrate rapid strength development in casted blocks or in the applied coating: as the castable or coated structure may only be utilized after complete setting of the composition, a slow development of strength can be disadvantageous.

U.S. Pat. No. 5,135,576 (Knut et al.) discloses a composite structure comprising: either an outer layer of ceramic material bonded to an internal structure of super concrete; or, an outer structure of super concrete bonded to an inner layer of ceramic material. The ceramic material is selected from inorganic or metallic products which are subjected to a temperature of at least 540° C. and above during manufacture or use. The super concrete comprises densely packed particles of inorganic materials embedded in a matrix based on a hydraulic cement and having a strength of at least 70 MPa.

CN 1618887 A (Hunan University) discloses a refractory anti-wear inorganic paint, which paint is prepared from: aluminium dihydrogen phosphate as adhesive; alumina ($Al_2O_3$); silicon carbide (SiC); and, a solidifying agent.

CN101570650 A (Beijing Tongda Refractory Technologies Co. Ltd) provides a method for preparing a wear resistant, fire-retardant coating based on: aggregate raw materials selected from plate-shaped, tabular alumina, brown alumina and bauxite chamotte; fine powder materials selected from plate-shaped, tabular alumina powder, flint clay powder, $\alpha$-$Al_2O_3$ micro-powder and ceramic powder; bonding agents selected from phosphoric acid solution, solid aluminium dihydrogen phosphate and clay powder; fused magnesite as a curing agent; and, sintering aids selected from sodium borate and sodium hexametaphosphate.

FR 2943665 (Kerneos) discloses a self-leveling mortar comprising, based on the total weight of the dry mortar: i) from 50 to 90 wt. % aggregates, at least 30 wt. % of which are synthetic, inorganic alumino-calcic aggregates comprising 30 wt. % of alumina; and, ii) from 10 to 50 wt. % of ettringite binder comprising calcium sulfates and a calcium aluminate mineral compound containing calcium (C) oxide and aluminum (A) oxide in a molar ratio (C/A) of from 1.2 to 2.7. The binder is soluble and combined into one or more amorphous and/or crystallized mineralogical phases. A wet mortar is obtained by mixing the afore-described dry mortar with water in an amount such that the water to solids ratio is less than 0.5:1.

U.S. Pat. No. 10,221,096 (Dubey) discloses a method for making geo-polymer cementitious binder compositions for cementitious products such as concrete, pre-cast construction elements and panels. Geopolymer cementitious compositions are made by mixing a synergistic mixture of thermally activated aluminosilicate mineral, calcium aluminate cement, a calcium sulfate and a chemical activator with water.

The above prior disclosures considered, there remains a need in the art to develop cementitious compositions which, when cured, can provide a coating or a composite structure which exhibits physical and chemical stability at high temperatures—for instance at ≥400° C.—and which provides protection from erosion and mechanical resistance under severe environmental conditions. The composition should further be characterized by rapid strength development, good adhesion and limited shrinkage upon curing.

STATEMENT OF THE INVENTION

In accordance with a first aspect of the present invention there is provided a two-component (2K) anhydrous composition comprising:

- a first component (1) comprising:
  - calcium aluminate cement;
  - Ground Granulated Blast Furnace Slag (GGBS); and,
  - fumed silica; and,
- a second component (2) comprising:
  - calcined bauxite; and,
  - fused zirconia mullite.

In a number of embodiments, two-component (2K) anhydrous composition comprises:

- a first component (1) comprising, based on the total weight of non-volatile constituents in the composition:
  - from 15 to 25 wt. %, preferably from 18 to 23 wt. % of said calcium aluminate cement;
  - from 15 to 25 wt. %, preferably from 18 to 23 wt. % of said Ground Granulated Blast Furnace Slag (GGBS); and,
  - from 1 to 15 wt. %, preferably from 3 to 15 wt. % of said fumed silica; and,
- a second component (2) comprising, based on the total weight of non-volatile constituents in the composition:
  - from 15 to 35 wt. %, preferably from 20 to 35 wt. % of said calcined bauxite; and,
  - from 15 to 35 wt. %, preferably from 20 to 35 wt. % of said fused zirconia mullite.

It is preferred that the ratio by weight of calcium aluminate cement to Ground Granulated Blast Furnace Slag in the composition is from 0.8-1.2:1, for example from 0.9-1.1:1.

The composition may further comprise silicon carbide which should desirably be present in the composition in an amount of from 5 to 20 wt. %, based on the total weight of non-volatile constituents. It is preferred that at least a part of any silicon carbide present in the composition is included in said first component (1).

In accordance with a second aspect of the present invention there is provided a curable coating composition comprising the two-component (2K) composition as defined herein above and in the appended claims and water. The coating composition is desirably characterized by a water factor of from 0.5 to 1.5, preferably from 0.75 to 1.25.

The present invention also provides for a cured product obtained from the coating composition as defined herein above and in the appended claims. The coating composition of the shows—upon curing—rapid strength development, negligible shrinkage and practicable adhesion to inter alia metallic substrates and refractory materials. The coating composition is also considered to present an inexpensive means of proving protection to substrates which are to be exposed to severe environmental conditions including but not limited to high temperatures and abrasive wear.

DEFINITIONS

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified. For completeness, the term "comprising" encompasses "consisting of".

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0" specifically includes 0 wt. %: the ingredient defined by said range may or may not be present in the composition.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

"Two-component (2K) compositions" in the context of the present invention are understood to be compositions in which a first component (1) and a second component (2) must be stored in separate vessels because of their (high) reactivity. The two parts are mixed only shortly before application and then react, typically without additional activation, with bond formation. Higher temperatures, moisture or a continuous aqueous phase may be applied in order to accelerate the reaction between mixed components.

The term "anhydrous" is intended to mean herein that the applicable composition, component or part comprises less than 0.25 wt. % of water, based on the weight of the mixture, component or part. The term "essentially free of" should be interpreted analogously as meaning the relevant composition, component or part comprises less than 0.25 wt. % of the stated element.

As used herein, the term "water" is intended to encompass tap water, spring water, purified water, de-ionized water, de-mineralized and distilled water. Water is included in the coating compositions of the present invention in its liquid form. The presence of solid water particles—ice—is not desirable as solid water cannot be mobilized for the formation of the hydrates required for the development of strength in cured coating composition.

The aforementioned composition has been defined by "wt. % based on the total weight of all the non-volatile constituents in the composition". For completeness, a volatile constituent is a constituent which has an initial boiling point of less than or equal to 250° C. as measured at a standard atmospheric pressure of 101.3 kPa. A non-volatile constituent is therefore a constituent which has an initial boiling point of more than 250° C. as measured at a standard atmospheric pressure of 101.3 kPa.

By "refractory material" to which the coating composition of the present application may be applied is meant a material having a melting point above 1500° C. This definition encompasses: refractory materials which are elements, such as graphite, boron, silicon, titanium, hafnium, zirconium, molybdenum, niobium, tantalum and tungsten; and, refractory materials which are compounds, said compounds typically being silicides, oxides, borides or carbides. Examples of refractory compounds include: aluminum oxide; aluminium nitride; silicon oxide; magnesium oxide; calcium oxide; zirconium oxide; chromium oxide; silicon carbide; silicon nitride; boron carbide; and, boron nitride. The term "refractory material" is further intended to encompass both monolithic materials and shaped materials. And there is no particular intention to limit the shape of such refractory materials: illustrative shapes include ceramic fibers, blocks, bricks, wedges, tiles and plates but more complex geometries are equally envisaged.

As used herein, the term "metallic material" means a pure metal, a metal alloy or a metal composite. As exemplary metals and metallic alloys to which the coating compositions of the present invention may be applied, mention may be made of: aluminum; aluminum alloys; bronze; beryllium; beryllium alloys; chromium; chromium alloys; cobalt; cobalt alloys; copper; copper alloys; gold; iron; iron alloys; steels; magnesium; magnesium alloys; nickel; nickel alloys; lead; lead alloys; tin; tin alloys, such as tin-bismuth and tin-lead; zinc; zinc alloys; and, superalloys, such as International Nickel 100 (IN-100) or International Nickel 718 (IN-718). Representative steels include: crucible steel; carbon steel; spring steel; alloy steel; maraging steel; and, stainless steel, inclusive of austenitc stainless steel, ferritic stainless steel, duplex stainless steel, and Martensitic stainless steel. And again there is no particular intention to limit the shape of such metallic materials: the complex geometries of pipes, elbows, hoppers, bins, chutes, furnaces and the like found in industrial installations are certainly envisaged.

As used herein, "concrete" means any type of building material containing aggregates such as stone, gravel, brushed rock or sand which are embedded in a matrix—cement or binder—that fills the space between the aggregate particles and binds them together. Exemplary matrices include Portland Cement, mineral mortar, asphalt and polymer resins. The "concrete" may further include organic or silica-based fibers or metallic wires, cables or rods as reinforcing materials.

For completeness, the term "water factor" is used herein to denote the weight of water used in a coating composition divided by the total weight of used non-volatile components (w/w).

As used herein, "curing" refers to the reactions through which a given composition hardens from a fluid mixture into a solid. Broadly, curing may be performed herein by exposure to ambient conditions or by deliberate exposure to heat or radiation.

Unless otherwise stated, the term "particle size" refers to the largest axis of the particle. In the case of a generally spherical particle, the largest axis is the diameter.

The term "mean particle size" (D50), as used herein, refers to a particle size corresponding to 50% of the volume of the sampled particles being greater than and 50% of the volume of the sampled particles being smaller than the recited D50 value. Similarly, if used, the term "D90" refers to a particle size corresponding to 90% of the volume of the sampled particles being smaller than and 10% of the volume of the sampled particles being greater than the recited D90 value.

Viscosities of the coating compositions described herein are, unless otherwise stipulated, measured using the Brookfield Viscometer at standard conditions of 20° C. and 50% Relative Humidity (RH). The method of calibration, the spindle type and rotation speed of the Brookfield Viscometer are chosen according to the instructions of the manufacturer as appropriate for the composition to be measured.

DETAILED DESCRIPTION OF THE INVENTION

First Component (1) of the Two-Component Anhydrous Composition

Component A of the composition of the present invention necessarily comprises: i) calcium aluminate cement; ii) Ground Granulated Blast Furnace Slag (GGBS); and, iii) fumed silica.

i) Calcium Aluminate Cement

The composition of the present invention comprises calcium aluminate cement. It is preferred that the composition comprises, based on the total weight of non-volatile constituents in the composition, from 15 to 25 wt. %, preferably from 18 to 23 wt. % of said calcium aluminate.

As used herein, the term "calcium aluminate cement" refers to cements in accordance with Standard EN 14647 Calcium Aluminate Cement: Composition, specifications and conformity criteria. Such cements may be produced by smelting or sintering as is known in the art and within this Standard can be categorized into the groups: rich in iron; and, low in iron. So-called iron-free calcium aluminate cements are not included in the definition of EN 14647.

Typical calcium aluminate cements that are rich in iron are produced by means of the smelting process, have a grey to black-grey colour and can be characterized by their chemical composition by weight as follows: 36-42% $Al_2O_3$; 2-6% $SiO_2$; 14-19% $Fe_2O_3$; 37-40% CaO; less than 1.5% MgO; and less than 0.4% $SO_3$. Calcium aluminate cements that are low in iron are coloured beige to grey and typically contain by weight: 50-55% $Al_2O_3$, 2-6% $SiO_2$, 1-3% $Fe_2O_3$, 37-40% CaO and less than 1.5% MgO as well as less than 0.4% $SO_3$. It is therefore evident that the colour of calcium aluminate cements becomes darker the higher their iron content.

When manufacturing calcium aluminate cements, the following mineral phases form, depending on the selected ratio of aluminium oxide (A) to calcium oxide (C): i) in calcium aluminate cement with a high iron content: monocalcium aluminate (CA), brown millerite ($C_4AF$), belite ($C_2S$), gehlenite ($C_2AS$), mayenite ($C_{12}A_7$) and perovskite (CT); and, ii) in calcium aluminate cement types with a low iron content, CA, $C_2AS$, CT and $C_{12}A_7$.

The monocalcium aluminate phase (CA) is mainly responsible for desirable hydraulic properties of the calcium aluminate cements, in particular their early strength development as compared to calcium silicate type cements. It is considered that the phases CA and, if included, $C_{12}A_7$, are the only phases in calcium aluminate cements that react quickly with water. However, whilst it may be stated that the reactivity of calcium aluminates with water increases with an increase in the C/A molar ratio term, an excessively high $C_{12}A_7$ content can promote the premature setting of the calcium aluminate cement on account of its high hydraulic reactivity.

Preferred calcium aluminate cements for use in the present invention may be characterized by an aluminum oxide content of preferably 30 to 55 wt.-%, more preferably 35 to 45 wt.-%, based on the total weight of the calcium aluminate cement. In another embodiment the calcium aluminate cements for use in the present invention have preferably monocalcium aluminate (CA) as main mineral phase, which means that CA is the biggest fraction of all present mineral phases in the calcium aluminate cement, preferably the CA content is >50 wt.-%, based on the total weight of the calcium aluminate cement. In another embodiment the calcium aluminate cements for use in the present invention have preferably a refractoriness of >1000° C., preferably >1200° C.

Without intention to limit the present invention, exemplary commercially available calcium aluminate cements include: Istra™ 40 and Istra™ 50 available from Calucem; Ciment Fondu and Secar™ 51 available from Kerneos; Electroland available from Cementos Molins; and Gorkal™ 40 and Gorkal™ 50 available from Gorka.

ii) Ground Granulated Blast Furnace Slag (GGBS)

The composition of the present invention comprises Ground Granulated Blast Furnace Slag (GGBS). It is preferred that the composition comprises, based on the total weight of non-volatile constituents in the composition, from 15 to 25 wt. %, preferably from 18 to 23 wt. % of said Ground Granulated Blast Furnace Slag. In an alternative expression of the composition, which is not intended to be mutually exclusive of that given above, it is preferred that the ratio by weight of calcium aluminate cement to Ground Granulated Blast Furnace Slag in the composition is from 0.8 to 1.2:1 and preferably from 0.9 to 1.1:1: It is noted that these ranges include the ratio term 1:1 which herein represents a highly preferred ratio by weight.

Ground Granulated Blast Furnace Slag (GGBS) is a by-product derived from waste slag, which is produced during the manufacture of pig iron from iron ore and limestone in a blast furnace. Blast furnace slag—a molten material composed from the gangue derived from the iron ore, the combustion residue of the coke, the limestone and other materials that are added—"floats" as a skin on top of the newly formed pig iron. The chemical composition of the molten slag can vary widely depending on the nature of the ore, composition of the limestone flux, coke composition and the type of iron being made.

The molten slag is granulated by quenching or, more specifically, by feeding it into jets of water. The rapidly cooled granulated solid consists of over 90% glass. The granules are then ground to a fine powder to produce the GGBS. Ground Granulated Blast Furnace Slag is latently hydraulic, that is, it will hydrate if exposed to an alkaline environment.

Conventionally, the Ground Granulated Blast Furnace Slag will have the following composition, based on the weight of said slag: from 30 to 50 wt. % lime (CaO); from 28 to 38 wt. % silica ($SiO_2$); from 8 to 23 wt. % alumina ($Al_2O_3$); from 1 to 17 wt. % magnesia (MgO); from 1 to 2.5 wt. % sulfur; and, from 1 to 3 wt. % ferrous and manganese oxides. It is however known in the art that the latent hydraulic binding force of the slag depends upon the specific composition thereof. As such, it is herein preferred that the Ground Granulated Blast Furnace Slag meets at least one of the following compositional requirements:

i) a silica ($SiO_2$) content of from 28 to 35 wt. %, preferably from 28 to 32 wt. %;
ii) from 10 to 23 wt. %, preferably from 12 to 23 wt. % alumina ($Al_2O_3$); and;
iii) a ratio by weight of $(CaO+MgO+Al_2O_3)/SiO_2$ of greater than 1.0, preferably greater than 1.5.

It is noted that these requirements are not mutually exclusive: one, two or three of requirements may be met.

Independently of or additional to the above compositional preferences, it is preferred that the Ground Granulated Blast Furnace Slag has: a) a glassiness of at least 92%, as determined by Infrared Absorption Spectroscopy; and, b) a fineness of at least 5000 $cm^2/g$, as determined in accordance with the air permeability method (Blaine) of Standard EN 196-6.

It will be recognized that a single Ground Granulated Blast Furnace Slag source may not per se satisfy all of the preferred properties. It is therefore perceived that one may need to form a mixture of at least two Ground Granulated Blast Furnace Slag sources so that the mixture provides the desired properties.

iii) Fumed Silica

The composition comprises fumed silica. It is preferred that the composition comprises, based on the total weight of non-volatile constituents in the composition, from 1 to 15 wt. %, preferably from 3 to 15 wt. % or from 3 to 12 wt. % of said fumed silica. At least a part of the fumed silica is formulated into the first component of the composition. However, this does not preclude a fraction of the fumed silica being included in the second component as defined herein.

Fumed silica is defined as finely divided amorphous silicon dioxide particles produced by high temperature in an oxygen-hydrogen flame: an exemplary pyrogenic process yielding fumed silica is the vapor phase hydrolysis of silicon tetrachloride. For completeness, the fumed silica for use in the present invention should be untreated and therefore hydrophilic. Treated or hydrophobic fumed silica is not considered suitable.

As generally understood in the art, fumed silica contains agglomerated or aggregated clusters of primary particles. The primary particles are the smallest particles that are visible in high-resolution transmission electron microscopy (TEM) images and cannot be further comminuted: such primary particles range in size from 5 nm to 100 nm. Several primary particles can congregate at their points of contact to form a secondary structure: these congregated structures include both aggregates and, when present, agglomerates. Aggregates are clusters of two or more primary particles that are either impossible or very difficult to break down using conventional mixing or dispersing devices: the primary particles of an aggregate are sintered together. Agglomerates are comprised of two or more aggregates that are, in contrast, joined together loosely: in an agglomerate, the aggregated particles may be held together by electrostatic forces and Van der Waals forces and, as such, may be broken down to smaller agglomerates and aggregates upon exposure to conventional high intensity mixing conditions for cementitious compositions or to conditions sufficient to form a fumed silica dispersion.

As used herein, the "secondary particle size" of fumed silica refers to the final size of the congregated particles. The secondary particle size of fumed silica may be measured by dynamic light scattering analysis, using devices such as the Partica LA-950 Particle Size Distribution Analyzer available from Horiba Ltd. By this method, the mean particle size (D50) may be calculated.

It is preferred herein that the fumed silica has, in dry form, a mean secondary particle size (D50) of from 0.1 μm to 30 μm, for example from 0.1 μm to 10 μm.

A suitable commercial grades of hydrophilic fumed silica which have utility in the present invention mention may be made of: the Aerosil® product line available from Degussa AG, for instance AEROSIL® 150, AEROSIL® 200 SP and AEROSIL® 300; the Sipernat® product lines from Degussa AG, for example Sipernat® 22LS; and, the Cab-o-sil product lines from Cabot Corporation.

Second Component (2) of the Two-Component Anhydrous Composition

Component B of the composition of the present invention necessarily comprises: i) calcined bauxite; and, ii) fused zirconia mullite.

i) Calcined Bauxite

The second component of the composition comprises calcined bauxite. It is preferred that the composition comprises, based on the total weight of non-volatile constituents in the composition, from 15 to 35 wt. %, preferably from 20 to 35 wt. % of said calcined bauxite. The two component (2K) anhydrous composition may, for example, comprise from 20 to 30 wt. % of said calcined bauxite.

Bauxite itself is an impure form of alumina containing other oxides including, for example, iron oxide, titania and silica. As is known in the art, calcined bauxite is produced by sintering superior grade or high-alumina bauxite—typically in rotary, round or shaft kilns—at high temperatures, for instance from 800° C. to 1600° C. This process of calcining the bauxite removes moisture therefrom and gives calcined bauxite its characteristic high alumina content and refractoriness, low iron content, and grain hardness and toughness.

Without intending to limit the present invention, the calcined bauxite of the present invention may be characterized by having, based on the weight of the calcined bauxite: a) an alumina content of at least 82 wt. % and preferably at least 83 wt. %; b) a silica ($SiO_2$) content of less than 5 wt. %; c) a titanium dioxide content of less than 4.5 wt. %; and, d) an $Fe_2O_3$ content of less than 4.5 wt. %. The calcined bauxite may be further characterized by a Loss on Ignition of less than 0.5 wt. %, as determined in accordance with ASTM C114 Standard test methods for chemical analysis of hydraulic cement.

Independently or additionally to this compositional requirement, it is herein preferred that the particle size of the calcined bauxite is smaller than 35 mesh and is preferably in the range of from 50 mesh to 500 mesh, for example from 65 to 325 mesh, as determined in accordance with ISO 3310-1:2016 Test sieves—Technical requirements and testing—Part 1: Test sieves of metal wire cloth.

ii) Fused Zirconia Mullite

The second component of the composition comprises fused zirconia mullite. It is preferred that the composition comprises, based on the total weight of non-volatile constituents in the composition, from 15 to 35 wt. %, preferably from 20 to 35 wt. % of said fused zironia mullite. The two component (2K) anhydrous composition may, for example, comprise from 20 to 30 wt. % of said fused zironia mullite.

As is known in the art, mullite ($3Al_2O_3 \cdot 2SiO_2$) is an orthorhombic homogeneous solid solution of alumina in sillimanite and can be made by heating andalusite, sillimanite or kyanite. Fused zirconia mullite can be prepared by blending a pre-determined proportion of zirconia with mullite and heating the blend to a temperature sufficient to melt the blend followed by cooling to form a solidified mass. The solidified mass is then crushed to produce a particulate form of the fused zirconia mullite. It is believed that the zirconia is substantially dispersed in the form of rods and/or nodules in the mullite and this imparts thermal shock resistance and chemical resistance to the material.

It is preferred herein that the fused zirconia mullite used herein comprises, based on the weight of the fused zirconia mullite: from 25 to 45 wt. %, for example from 30 to 45 wt. % of zirconia; and, from 55 to 75 wt. %, for example from 55 to 70 wt. % of mullite. An amount of zirconia below 25 wt. % would be insufficient to impart effective chemical and thermal shock resistance to the obtained coating while it is considered that an amount above 45 wt. % would impart brittleness to that material.

Independently or additionally to this compositional requirement, it is herein preferred that the particle size of the fused zirconia mullite is smaller than 100 mesh and is preferably in the range of from 120 mesh to 500 mesh, as determined in accordance with ISO 3310-1:2016 Test sieves—Technical requirements and testing—Part 1: Test sieves of metal wire cloth.

Silicon Carbide

The two-component (2K) anhydrous composition may further comprise silicon carbide: as such that composition may be further characterized by comprising, based on the total weight of non-volatile constituents in the composition, from 0 to 20 wt. % of said silicon carbide. It is preferred that the two-component (2K) anhydrous composition comprises, based on the total weight of non-volatile constituents in the composition, from 5 to 20 wt. %, preferably from 15 to 15 wt. % of said silicon carbide. The silicon carbide may be formulated into either one or both of the two components of the composition but it is preferred that at least a part—and desirably the major part by weight—of the silicon carbide is included in the first component thereof.

It is noted that either the alpha (α-) or the beta (β-) silicon carbide polymorphs independently or mixtures of said polymorphs can be employed in the present composition. However, the β-silicon carbide polymorph has relatively poor oxidation resistance compared to the alpha (α-) form. Thus, the alpha (α-) polymorph is generally preferred over the beta (β-) polymorph for that reason and, conveniently, is typically of lower cost commercially. In a further statement of preference, which is not intended to be mutually exclusive of the polymorphic form, it is preferred that said silicon carbide has a minimum SiC content—as equated with purity—of 98 wt. %, and more preferably a minimum SiC content of 99 wt. %.

Independently or additionally to the stated compositional preferences, it is herein preferred that the particle size of the silicon carbide is smaller than 100 mesh and is preferably in the range of from 200 mesh to 500 mesh, as determined in accordance with ISO 3310-1:2016 Test sieves—Technical requirements and testing—Part 1: Test sieves of metal wire cloth.

It is considered that a mixture of silicon carbide grains having different average particle sizes may be utilized in the present application. This can facilitate particle packing, thereby reducing porosity and increasing the abrasion resistance of the cured composition. However, it is preferred that none of the silicon carbide grains included in the composition should exceed 5 mm in size (4 mesh): if such larger grain is present, it will tend to settle out of a raw coating composition batch and lead to a product which is not homogeneous, especially if the vehicle content of the raw batch is toward the high end of its stated range.

Adjuvants

The term "adjuvant" as used herein denotes a substance within the meaning of standard EN 206.1, and specifically the definition in paragraph 3.1.22 thereof: a product added to the two-component (2K) anhydrous composition—in either one or both parts of said composition prior to the mixing thereof—in small amounts relative to the mass of composition in order to modify the properties of the fresh or cured composition. Such adjuvants can be used in such combination and proportions as desired, provided they do not adversely affect the nature and essential properties of the composition. While exceptions may exist in some cases, the composition should not comprise in toto more than 20 wt. %, based on the total weight of non-volatile constituents in the composition, of adjuvants and preferably should not comprise more than 10 wt. %, of said adjuvants.

The composition may comprise at least one adjuvant chosen from: plasticizers; superplasticizers; setting retarders, such as gluconates, carboxylic acids (citric acid, tartaric acid), boric acid and alkali metal phosphates; catalysts; setting accelerators, such as nitrate, thiocyanate and chloride salts; curing accelerators, such as alkali metal carbonates; air entrainers, such as sodium lauryl sulfates; anti-shrinkage agents; anti-bubbling or antifoam agents; leak-proofing agents such as calcium stearate; natural pozzolanic compounds, such as pumice, trass, santorin earth, kieselguhr, homstone and chert; synthetic pozzolanic compounds, such as fired, ground clay (ground brick), fly ashes, silica dust, oil shale ash and metakaolin; anti-sedimentation agents, such as bentonites and attapulgites; mineral or organic pigments; a latex or latices; rheology modifiers; and, water retainers, such as starch ethers, cellulose ethers and modified cellulose ethers.

As is known in the art, a "superplasticizer" denotes a de-flocculant organic compound, which acts by electrostatic repulsion and/or by steric bulk. Exemplary superplasticizers having utility in the present invention include but are not limited to: polycarboxylates; melamine sulfonates; and, polynaphthalene sulfonates.

The inclusion of organic homo-polymers and co-polymers in the cementitious composition is not precluded: a latex or latices of such polymers can moderate the adhesive and physical properties of the composition and any coatings obtained there from. Non-limiting examples of suitable (co-)polymers include: vinyl acetate homopolymers; copolymers of vinyl acetate with at least one further vinyl ester;

copolymers of vinyl acetate with ethylene; copolymers of vinyl acetate, ethylene and at least one further vinyl ester; copolymers of vinyl acetate, ethylene and at least one (meth) acrylic ester; copolymers of vinyl acetate with (meth)acrylates and other vinyl esters; copolymers of vinyl acetate, ethylene and vinyl chloride; copolymers of vinyl acetate, ethylene and styrene; copolymers of vinyl acetate with acrylates; styrene-acrylic ester copolymers; styrene-1,3-butadiene copolymers; and, vinyl chloride-ethylene copolymers.

Preference is given to: vinyl acetate homopolymers; copolymers of vinyl acetate with ethylene; copolymers of vinyl acetate, ethylene and styrene; copolymers of vinyl acetate, ethylene and at least one co-monomer selected from the group consisting of vinyl esters having from 1 to 15 carbon atoms in the carboxylic acid radical, such as vinyl propionate, vinyl laurate and vinyl versatate; copolymers of vinyl acetate, ethylene and at least one co-monomer selected from (meth) acrylic esters of unbranched or branched alcohols having from 1 to 15 carbon atoms, such as N-butyl acrylate and 2-ethylhexyl acrylate; copolymers of vinyl acetate, vinyl esters having from 1 to 15 carbon atoms in the carboxylic acid radical and (meth) acrylic esters of unbranched or branched alcohols having from 1 to 15 carbon atoms; and, copolymers of vinyl acetate, ethylene and vinyl chloride.

Such polymers may be prepared by conventional means accessible to the skilled artisan, such as by emulsion polymerization. In the alternative, such polymers may be provided from commercial sources. By way of example, reference may be made to: FX7000 styrene acrylate copolymer, available from Elotex; HD 1500 vinyl acetate/vinyl versatate copolymer, available from Elotex; and, and FX2322 vinyl acetate/ethylene copolymer available from Elotex.

The term "rheology modifier" denotes an organic compound having utility in increasing one or more of the viscosity, the cohesion and the shear threshold of the composition. Rheology modifiers may further have an anti-bleeding effect. As exemplary rheology modifiers having utility in the present invention mention may be made of modified or unmodified polysaccharides such as diutan gums, xanthan gums, gellan gums and welan gums.

Methods and Applications

In use, the first and second components of the composition as defined herein above are admixed together with water. Without intention to limit the present invention, admixing will conventionally entail dry mixing at least a fraction—preferably the majority of and potentially all—of the solid components in an appropriate mixer: water is then gradually added to the mixture together with the remaining solids fraction, if applicable, while running the mixer. High intensity mixing—in which a mixing energy of at least 0.5 kW per 100 kg of ingredients is used—is preferred to ensure that a homogeneous mixture is obtained. The use of a flat-bladed mixer may also be of benefit.

The method by which the coating composition is to be applied is one determinant of the total amount of water added and the time at which any water is admixed with the dry ingredients relative to the application of the coating composition. However, a further determining consideration is that the addition of too much water may result in particulate materials falling out of suspension, which materials can be difficult to re-suspend. In these regards, a water factor of from 0.5 to 1.5, for example a water factor of from 0.75 to 1.25, may be mentioned as being suitable in mixing the present coating composition. Independently of or additional to the water factor, it is preferred that the coating composition be characterized by a viscosity at application of less than 100000 centipoise, for example from 10000 to 100000 centipoise.

In accordance with the broadest process aspects of the present invention, the above described coating compositions are applied to a substrate and then allowed to set in situ. Prior to applying the coating compositions, it is often advisable to pre-treat the relevant surfaces to remove foreign matter there from: this step can, if applicable, facilitate the subsequent adhesion of the coating compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

The coating compositions are then applied to the preferably pre-treated surfaces of the substrate by conventional application methods such as: brushing; roll coating; using a trowel; using a float; pumping; ramming; casting; gunning; and spraying. The methods of gunning and spraying may be performed using conventional, commercially available equipment but selecting pressure conditions, nozzle type(s), conduit (hose) length and diameters such that clogging of the equipment is obviated and a controlled application pattern is achieved.

Whilst the application of the coating compositions by the aforementioned methods may be performed in a single or multiple step manner, it is recommended that the compositions be applied to a total wet film thickness of from 10 to 100 mm, for example from 25 to 75 mm or from 25 to 50 mm.

The setting of the coating compositions of the invention can occur at temperatures in the range of from room temperature to to 100° C., preferably from 30° C. to 100° C., and in particular from 40° C. to 80° C. The temperature that is suitable depends on the specific compounds present and the desired setting rate and can be determined in the individual case by the skilled artisan, using simple preliminary tests if necessary. Where applicable, the temperature of the mixture formed from the respective components of the coating composition may be raised above the mixing temperature and/or the application temperature using conventional means including microwave induction. Alternatively or additionally, the coating compositions may be applied to a pre-heated substrate, this pre-heating facilitating the fast setting of the composition and an improved adhesion to the substrate. In an illustrative embodiment, the coating compositions are applied in a series of thin layers to attain a desired total thickness, wherein the substrate is maintained at a temperature of from 30 to 100° C. throughout the application of each layer.

The coating composition of the present invention may be applied to existing structures fabricated from concrete, from refractory materials or from metallic materials. Further, the coating composition may be used in a restorative function, for instance to repair equipment wherein a coating or a refractory surface material has become displaced or abraded.

The following examples are illustrative of the present invention and are not intended to limit the scope of the invention in any way.

EXAMPLES

The coating compositions below were mixed in a dynamic mixer. The mixing procedure starts with the addition to the mixer of the combined calcium alumina cement (CAC) and Granulated Blast Furnace Slag (1:1 ratio by weight): the fumed silica, silicon carbide, catalyst and super-plasticizer were then dry mixed. The calcined bauxite and fused zirconia mullite are then added together with water in a sufficient amount to achieve a water factor of 1.

TABLE 1

| Ingredient | Example 1 (g) | Example 2 (g) | Example 3 (g) | Example 4 (g) |
|---|---|---|---|---|
| Calcium alumina cement (CAC) plus Granulated Blast Furnace Slag (1:1 ratio by weight) | 35-40 | 38-43 | 35-40 | 35-40 |
| Silicon Carbide | 6-11 | 6-11 | 3.5-7 | 3.5-7 |
| Fumed Silica | 3.5-7 | 0 | 6-11 | 6-11 |
| Catalyst | 0 | 0.02-0.05 | 0.02-0.05 | 0.02-0.05 |
| Superplasticizer | 0.3-0.8 | 0.3-0.8 | 0.3-0.8 | 0.3-0.8 |
| Calcined Bauxite | 20-30 | 25-30 | 20-30 | 20-23 |
| Fused Zirconia Mullite | 20-30 | 25-30 | 20-30 | 20-23 |
| Silicon Carbide (Green) | | | | 7-13 |

The Examples were subjected to the following protocols under identical testing conditions, thereby allowing each Example to be compared.

Open time: The open time (minutes) of the cementitious coating composition is the time in which a tile can still be placed in the applied composition and sufficient wetting of the tile with the composition is assured. The end of the open time is indicated by having insufficient wetting of the composition on the backside of the tile. Specifically, 5cm by 5cm earthenware tiles were embedded in the cementitious composition by loading with a 2 kg weight for 30 seconds. The tile was removed and the backside of the tile was evaluated: if less than 50% by area of the tile was covered with the cementitious composition, the open time was deemed concluded.

Cure Time: Herein cure time (hours) is the time the cementitious coating composition takes to set or harden at a given coating thickness. It is determined via measurement of ultrasonic wave velocity through the sample. The further the curing proceeded, the faster an ultrasonic wave was conducted through the sample. Depending on the cementitious coating formulation the final velocity of the ultrasonic wave approached a value of about 2400 $ms^{-1}$. Herein Cure Time was compared when a wave velocity of 1200 $ms^{-1}$ was reached.

Shore D Hardness: This is a standardized test consisting of measuring the depth of penetration of a specific indenter. Herein Shore D Hardness was determined in accordance with ASTM D2240 by the penetration of the Durometer indenter foot into the sample. As is known in the art, Shore D Hardness is a dimensionless measure providing a numeric value between 0 and 100, the higher number representing the harder material.

Two Body Abrasion: This test method determines the abrasion resistance of materials that are conventionally—or may be—subject to abrasive/frictional wear in actual service. This resistance property was measured according to ASTM—D 5963 Standard Test Method for Rubber Property—Abrasion Resistance (Rotary Drum Abrader). Specifically, the abrasion resistance is measured by moving a test piece across the surface of an abrasive sheet mounted to a revolving drum and is expressed as volume loss in cubic millimeters ($mm^3$). For volume loss, a smaller number indicates better abrasion resistance.

Dry or Scratching Abrasion: This test method covers a laboratory procedure for determining the resistance of materials to scratching abrasion by means of the dry sand/rubber wheel test. This resistance property was measured according to ASTM G-65: Standard Test Method for Measuring Abrasion Using the Dry Sand/Rubber Wheel Apparatus. As defined in that Standard, Procedure B was employed and abrasion test results were reported as volume loss in cubic millimeters ($mm^3$): materials of higher abrasion resistance will have a lower volume loss.

Gas Jet Erosion Test: This test method covers the determination of material loss by gas-entrained solid particle impingement erosion with jet-nozzle type erosion equipment. This resistance property was measured according to ASTM—G 76 Standard Test Method for Conducting Erosion Tests by Solid Particle Impingement Using Gas Jets. Test results were reported as volume loss of material in cubic millimeters ($mm^3$): materials of higher erosion resistance will have a lower volume loss.

Abrasion Resistance: This test method measures the relative abrasion resistance of the samples under standard conditions at room temperature. This resistance property was measured according to ASTM C 704: Standard Test Method for Abrasion Resistance of Refractory Materials at Room Temperature. Test results were reported as volume loss in cubic millimeters ($mm^3$): materials of higher abrasion resistance will have a lower volume loss.

Wet Abrasion Resistance: This is a high-stress laboratory abrasion test for the materials which uses a water slurry of aluminum oxide particles as the abrasive medium and a rotating steel wheel to force the abrasive across a flat test specimen in line contact with the rotating wheel immersed in the slurry. This resistance property was measured according to ASTM—B 611 Standard Test Method for Determining the High Stress Abrasion Resistance of Hard Materials. Test results were reported as volume loss in cubic millimeters ($mm^3$): materials of higher abrasion resistance will have a lower volume loss.

Compressive Strength: This property of test specimens of each Example—when loaded in compression at relatively low uniform rates of loading—was determined in accordance with ASTM—D695-02A: Standard Test Method for Compressive Properties of Rigid Plastics. Test results are reported in MPa.

The results are illustrated in Table 2 herein below.

TABLE 2

| Requirement | Test Method | Example 1 | Example 2 | Example 3 | Example 4 |
|---|---|---|---|---|---|
| Open Time (minutes) | — | 30 | 20 | 30 | 30 |
| Initial Cure time (Hours) | — | 24 | 24 | 24 | 24 |
| Hardness (Shore D) | ASTM - D2240 | 88 | 92 | 89 | 90 |
| Two Body Abrasion Test (Volume loss, $mm^3$) | ASTM - D 5963 | 65 | 70 | 54 | 60 |
| Dry Abrasion Test (Volume loss, $mm^3$) | ASTM - G 65 | 165 | 207 | 158 | 223 |
| Gas Jet Erosion Test (Volume loss, $mm^3$) | ASTM - G 76 | 9 | 63 | 9 | 103 |
| Abrasion Resistance Test (Volume loss, $mm^3$) | ASTM C 704 | 3.8 | 4.9 | 3.9 | 8.4 |
| Wet Abrasion Test (Volume loss, $mm^3$) | ASTM - B 611 | 404 | 538 | 333 | 765 |
| Compressive Strength (MPa) | ASTM - D695 -02A | 20 | 20 | 23 | 15 |

In view of the foregoing description and example, it will be apparent to those skilled in the art that equivalent modifications thereof can be made without departing from the scope of the claims.

The invention claimed is:

1. A two-component anhydrous composition comprising:
a first component comprising:
calcium aluminate cement;
Ground Granulated Blast Furnace Slag (GGBS); and
fumed silica; and
a second component comprising:
calcined bauxite; and
fused zirconia mullite.

2. The composition of claim 1, wherein, based on the total weight of non-volatile constituents in the composition:
the first component comprises:
from 15 to 25 wt. % of the calcium aluminate cement;
from 15 to 25 wt. % of the Ground Granulated Blast Furnace Slag (GGBS); and
from 1 to 15 wt. % of the fumed silica; and
the second component comprises:
from 15 to 35 wt. % of the calcined bauxite; and from 15 to 35 wt. % of the fused zirconia mullite.

3. The composition of claim 1, wherein the ratio by weight of the calcium aluminate cement to the Ground Granulated Blast Furnace Slag is from 0.8:1 to 1.2:1.

4. The composition of claim 1, further comprising from 5 to 20 wt. %, based on the total weight of non-volatile constituents in the composition, of silicon carbide.

5. The composition of claim 4, wherein at least a part of the silicon carbide is included in the first component.

6. The composition of claim 1, wherein the calcium aluminate cement has an aluminum oxide content of from 30 to 55 wt.%, based on the total weight of the calcium aluminate cement.

7. The composition of claim 1, wherein the Ground Granulated Blast Furnace Slag meets at least one of the following conditions:
a silica ($SiO_2$) content of from 28 to 35 wt. %, based on the total weight of the Ground Granulated Blast Furnace Slag;
an alumina ($Al_2O_3$) content of from 10 to 23 wt. %, based on the total weight of the Ground Granulated Blast Furnace Slag; or
a ratio by weight of a total of calcium oxide (CaO), magnesium oxide (MgO), and alumina ($Al_2O_3$) to silica ($SiO_2$) is greater than 1.0.

8. The composition of claim 1, wherein the Ground Granulated Blast Furnace Slag has:
a glassiness of at least 92%, as determined by Infrared Absorption Spectroscopy; and
a fineness of at least 5000 $cm^2/g$, as determined in accordance with the air permeability method (Blaine) of Standard EN 196-6.

9. The composition of claim 1, wherein the calcined bauxite has a particle size of from 35 mesh to 500 mesh, as determined in accordance with ISO 3310-1:2016.

10. The composition of according to claim 1, wherein the fused zirconia mullite comprises, based on the weight of the fused zirconia mullite, from 25 to 45 wt. % of zirconia and from 55 to 75 wt. % of mullite.

11. The composition of claim 1, wherein the fused zirconia mullite has a particle size of from 100 mesh to 500 mesh, as determined in accordance with ISO 3310-1:2016.

12. The composition of claim 1, further comprising a superplasticizer, present in an amount of from 0.3 to 0.8 wt. %, based on the total weight of non-volatile constituents in the composition.

13. A coating composition comprising the composition of claim 1 and water.

14. The coating composition of claim 13, having a water factor of from 0.5 to 1.5.

15. A cured product obtained from the coating composition of claim 13.

16. A coating on concrete, a refractory material, or a metallic material comprising the cured reaction product of claim 15.

17. A two-component anhydrous composition comprising:
a first component comprising, based on the total weight of non-volatile constituents in the composition:
from 15 to 25 wt. % of calcium aluminate cement;
from 15 to 25 wt. % Ground Granulated Blast Furnace Slag (GGBS); and
from 1 to 15 wt. % of fumed silica; and
a second component comprising, based on the total weight of non-volatile constituents in the composition:
from 15 to 35 wt. % of calcined bauxite; and
from 15 to 35 wt. % of fused zirconia mullite.

18. The composition of claim 17, further comprising from 5 to 20 wt. %, based on the total weight of non-volatile constituents in the composition, of silicon carbide.

19. The composition of claim 17, wherein the fused zirconia mullite comprises, based on the weight of the fused zirconia mullite, from 25 to 45 wt. % of zirconia and from 55 to 75 wt. % of mullite.

20. The composition of claim 17, further comprising a superplasticizer present in an amount of from 0.3 to 0.8 wt. %, based on the total weight of non-volatile constituents in the composition.

* * * * *